United States Patent [19]

Hijiya et al.

[11] 3,765,917

[45] Oct. 16, 1973

[54] SHAPED BODY OF GELATIN CONTAINING AMYLOSE AND/OR AMYLITOL

[75] Inventors: Hiromi Hijiya; Mamoru Hirao, both of Okayama, Japan

[73] Assignee: Ken Hayashibara, Okayama-ken, Japan

[22] Filed: Nov. 17, 1971

[21] Appl. No.: 199,653

[30] Foreign Application Priority Data
Nov. 24, 1970 Japan.............................. 45/102685
Dec. 5, 1970 Japan.............................. 45/107221

[52] U.S. Cl.................. 106/126, 106/122, 106/136
[51] Int. Cl. ........................... C08h 7/00, C08h 7/34
[58] Field of Search.................... 106/136, 130, 126; 99/142

[56] References Cited
UNITED STATES PATENTS

| | | | |
|---|---|---|---|
| 3,692,542 | 9/1972 | Guillaume............................ | 99/142 |
| 3,335,013 | 8/1967 | Wolfmeyer........................... | 99/142 |
| 3,431,121 | 3/1969 | Williams.............................. | 106/126 |
| 2,414,274 | 1/1947 | Sass..................................... | 106/126 |
| 3,653,934 | 4/1972 | Scherr.................................. | 106/126 |
| 2,834,771 | 5/1958 | Mitchell............................... | 260/117 |

*Primary Examiner*—Theodore Morris
*Attorney*—Kurt Kelman et al.

[57] ABSTRACT

Films or sheets, capsules, sponges, fibers, and other shaped bodies of gelatin have improved mechanical properties when containing 10 to 60 parts by weight of amylose and/or amylitol per 100 parts of the gelatin. They may further contain glycerol or other polyhydric alcohols as plasticizers in amounts effective to improve mechanical and optical properties of the bodies.

9 Claims, No Drawings

SHAPED BODY OF GELATIN CONTAINING AMYLOSE AND/OR AMYLITOL

This invention relates to shaped bodies which are water-soluble and edible, and particularly to improved bodies whose principal constituent element is gelatin.

Gelatin is commonly converted to films or sheets, capsules, and similar shaped bodies intended to be water soluble and edible, such as wrapping materials, coatings, and other enclosures for food and medicinals. Such wrapping materials recently have found a wide market in prepackaged food ready to be dropped in hot water with the wrapper.

Because of its origin from animal tissue, gelatin is not readily prepared to precise desired properties. Unless carefully purified, it has an unpleasant odor.

It has now been found that shaped bodies suitable for all known applications of gelatin, but of improved, and more readily reproduced properties can be made of mixtures of gelatin with amylose and/or amylitol, a sugar alcohol prepared by hydrogenating amylose, if the amylose and the amylitol prepared therefrom have a molecular weight corresponding to a degree of polymerization of 50 glucose units or less in the amylose. The mixtures are soluble in warm water, are edible, and can be converted to capsules, films, sheets, fibers, coatings, and the like by methods conventionally employed in preparing like bodies from gelatin alone. The mechanical properties of these bodies, particularly their elasticity, elongation, and strength can be controlled readily by varying the ratio of the ingredients and by adding varying amounts of plasticizers.

Whereas starches generally are not readily soluble in water in the presence of gelatin, and the solutions capable of being produced have a viscosity so high as to make it difficult to produce shaped bodies therefrom, the bodies being brittle and opaque, amylose which has a linear chain structure and is readily prepared from gelatinized starch by the action of isoamylase is compatible with gelatin and forms joint aqueous solutions therewith which have the low viscosity necessary for shaping bodies by the methods usual in forming gelatin bodies.

The starch hydrolyzate produced by the action of isoamylase contains an amylose fraction of relatively high molecular weight corresponding to a degree of polymerization (DP) of 100 or more, and low-molecular amylose having a DP of 20 - 30. The fraction of high molecular weight is not readily dissolved in water at a temperature below 60° C necessary for avoiding denaturing the gelatin present, and the amylose employed for this invention is mainly limited to a fraction whose DP does not exceed 50. Such amylose is readily obtained by subjecting corn starch to isoamylase.

The shaped bodies of the invention may be prepared from aqueous solutions which contain amylose in an amount of 10 percent to 60 percent on a dry basis of the gelatin present, all percentage and similar ratios herein being by weight unless otherwise specifically stated. The solutions and the bodies prepared therefrom may further contain an amount of a polyhydric alcohol effective as a plasticizer, normally 10 to 50 percent, but preferably not more than 40 percent on the basis of the gelatin present. Glycerol is preferred because of its ready availability and low cost, but other polyhydric alcohols are equally effective.

When the gelatin, amylose, and glycerol are mixed with enough water to form a homogeneous solution at 60° C, and the solution is cast on plate glass and dried at 60° to 90° C, the resulting sheet or film has good elasticity and good light transmission, both properties improving with increasing proportions of glycerol.

If the amount of amylose present exceeds 50 percent of the gelatin, a homogeneous aqueous dispersion is not readily obtained, and the transparency of the body prepared from the dispersion tends to be inferior because of the presence of small bubbles.

Sheets and other shaped bodies can be prepared successfully from gelatin and amylose alone, but the flexibility and transparency of the product is improved by the plasticizer, and the addition is necessary when soft capsules or film for wrapping food are to be prepared. Both the hard capsules prepared from gelatin and amylose only, and the soft capsules prepared from a mixture containing a plasticizer are stronger than those prepared from gelatin alone. The shaped bodies of this invention are superior to corresponding gelatin bodies by their greater stability under changing relative moisture in the ambient atmosphere. They are smoother and glossier than the gelatin products.

If so desired, the basically transparent and colorless bodies of the invention may be colored with food dyes and made opaque by adding suitable pigments as is known in itself. The shaped bodies of the invention swell and dissolve in lukewarm water and are readily digested by the human organism. The amylose present functions, inter alia, as a diluent for the gelatin to reduce its undesirable odor or taste. Because amylose is impermeable to oxygen, bodies of the invention containing amylose, when employed as envelopes for food, medicinal products, and the like, protect the contents against oxidation by atmospheric oxygen. Aqueous solutions of gelatin and amylose have lower viscosity than solutions of an equal weight of gelatin alone so as to facilitate application of coatings by spraying, and the freshly formed coatings are less tacky than gelatin coatings. The same properties are valuable for microencapsulation and like applications. It is possible to employ more concentrated aqueous solutions of gelatin and low-molecular amylose than of gelatin alone under otherwise similar processing conditions, thereby increasing the production rate because of the smaller amounts of coating or other solution to be employed, and the smaller amounts of water to be driven off by drying.

The bodies of the invention, more particularly sheets, foils, or films, are readily welded to each other by the application of heat and pressure. Because of the chemical inertness of the amylose, they may be employed as envelopes for oils and oily solutions, fats, or dry powders. The polyhydric alcohols when present may retain 10 percent water or more in the bodies which generally improves mechanical and optical properties.

The cost of amylose is generally lower than that of gelatin of good quality, and the invention permits shaped bodies heretofore prepared from gelatin alone to be produced at lower cost. In addition to the various shapes mentioned hereinbefore, photosensitive emulsions, medical sponges and dressings have been prepared according to this invention.

Amylose may be replaced partly or entirely by amylitol of low molecular weight which is readily obtained from the corresponding amylose, particularly from amylose having a DP of 20 to 50, by hydrogenation in the presence of Raney nickel as a catalyst. Amylitol is a chemically inert sugar alcohol whose solubility in water of the same temperature is 20 to 50 percent greater than that of the amylose having the same DP or molecular weight, and solutions of amylitol and gelatin in water having a temperature of 50° C or slightly higher may contain more than 40 percent amylitol on the basis of total solids. It is possible, therefore, to produce solutions of amylitol and gelatin which are more concentrated, yet less viscous than the corresponding solutions of gelatin and amylose.

Wet coatings prepared from solutions of gelatin and amylitol can be dried at a high rate without causing phase separation and loss of transparency in the films or sheets so produced. The shaped bodies essentially consisting of amylitol and gelatin are impermeable to air and are dimensionally and chemically stable. When free from plasticizer, they are resilient, but somewhat brittle. Polyhydric alcohols, such as glycerol, sorbitol, maltitol, propylene glycol, and the like have the same plasticizing effect on the gelatin amylitol mixtures as on the afore-described intimate mixtures of gelatin with amylose of similar molecular weight. Fibers, yarns, films, sponges, and sprayed coatings have been prepared successfully with plasticizer contents of 10 to 50 percent, based on the total dry solids present.

The amylose employed in this invention as such, or as an intermediate in the production of amylitol, may be prepared in any known manner, but is preferably prepared from a solution of gelatinized starch of any origin by enzymatic hydrolysis. The starch dispersion gelatinized by heating is cooled to about 50° C and mixed with an enzyme of microbial origin, such as that obtained from Aerobacter aerogenes ATCC 8724, in an amount of 30 units per gram of starch. When the mixture is incubated for 30 to 40 hours, then left standing for several hours at 40° C, adequate hydrolysis is achieved. Amylose of high molecular weight is insoluble in water at 40° C, and may be removed by filtering or otherwise, and the low-molecular amylose is precipitated as the principal product by further cooling so that it may be separated from the liquid phase.

When the starting material is corn starch, it may be dispersed in water at a rate to form a 27 percent dispersion, and gelatinized by heating the dispersion to a temperature below 170° C. The gelatinized starch may then be hydrolyzed by the action of isoamylase as described above. The hydrolyzate does not contain more than 20 percent amylose of higher molecular weight and may be mixed with gelatin without further purification for many applications.

When the amylose is dissolved in a weakly alkaline aqueous medium and exposed to hydrogen at a pressure of less than 150 kg/cm$^2$ and a temperature not exceeding 150° C in the presence of a Raney nickel catalyst, the amylose is exhaustively hydrogenated without any hydrolysis. The catalyst is removed from the hydrogenation mixture in a conventional manner, and the amylitol is recovered from the supernatant.

The following Examples are further illustrative of this invention:

EXAMPLE 1

One part amylose of low molecular weight, that is, a degree of polymerization of approximately 20 – 30, was prepared from waxy maize starch by fermentative hydrolysis as described above, was suspended in two parts water, and dissolved by heating the suspension at 90° to 95° C. One part gelatin was dissolved in 1.5 parts water at 60° C. Portions of the two solutions were mixed to produce coating solutions in which the amylose constituted 10, 15, 20, 25, and 30 percent of the total solute. Glycerol was added to each coating solution in an amount of 10 percent of the solids present in solution.

The rounded ends of glass rods 3 mm thick were dipped in the solutions, and the coatings formed thereby were dried in an air stream at 40° C. Ten hours later, the half capsules so formed were stripped from the glass rods and stored in a room held at 60 percent relative humidity.

The capsules containing 10 percent and 15 percent amylose were fully transparent and somewhat brittle. Those containing 20 percent and 25 percent amylose were almost transparent, and the brittleness increased with amylose content. The capsules containing 30 percent amylose were less transparent than those of lower amylose content. None of the capsules were less than good for use as hard medicinal capsules, and those containing 10 percent and 15 percent amylose were excellent. The elastic modulus of the several materials was good and made them substantially stronger than gelatin capsules.

When the procedure was repeated with an increased glycerol amount of 30 percent, no brittleness could be observed up to 20 percent amylose, and transparency was good up to the same amylose content. Capsules containing 25 percent and 30 percent amylose were slightly opaque and very slightly brittle. The capsules containing 20 percent amylose or more compared favorably with commercial gelatin capsules of excellent quality.

EXAMPLE 2

A suspension of 1 part amylose of low molecular weight obtained from corn starch in 1.5 parts water was heated in an autoclave for 15 minutes at 120° C, whereby the amylose was completely dissolved. One part of gelatin was separately dissolved in 1.5 parts water at 60° C. The two solutions were mixed to make the amylose content of the mixture 25 percent of the gelatin content on a dry basis, and a 2:1 mixture of glycerol and sorbitol was added in an amount of 15 percent of the combined solid constituents.

Capsules of excellent gloss and smoothness having low hygroscopicity were prepared in the manner of Example 1. Their transparency, elasticity, and uniformity was very good to excellent even when the amylose content was raised to 20 percent.

EXAMPLE 3

Amylose obtained from corn starch by fermentative hydrolysis and having a degree of polymerization of less than 50 was dispersed in water in a ratio of 1:1.5 and the dispersion was agitated at 120° C in an autoclave, whereby a clear solution was obtained within 15 minutes. A solution was prepared separately at 60° C from one part gelatin and 1.5 parts water. Portions of the two solutions were mixed to obtain a weight ratio of gelatin and amylose of 4:1. 25 Percent glycerol based on the combined weights of the solids dissolved were added, and the solution so obtained was extruded through a spinning nozzle into a hot air chamber at 80° C to produce filaments which were twisted into yarns in a conventional manner. Gauze woven from the yarn was water soluble.

EXAMPLE 4

Waxy maize starch was decomposed with isoamylase to produce amylose having a degree of polymerization of less than 50, and actually close to 30, and the amylose so obtained was hydrogenated in the presence of Raney nickel to amylitol having a corresponding molecular weight. The product was separated from the catalyst and the aqueous medium and dried to a powder. One part amylitol powder was dispersed in two parts water and completely dissolved when the dispersion was heated to 100° C. Separately, 1 part gelatin of pharmaceutical grade was dissolved in 1.5 parts water at 60° C. Portions of the two solutions were mixed to make the amylitol content of the respective mixtures 10, 20, 30, 40, and 50 percent of the gelatin present. Glycerol was added to each mixture in an amount of 10 percent of the dissolved solids. The mixtures were partly cast on clean plate glass and dried by means of an airstream of 80° – 90° C. The remainders of the mixtures were employed for dipping glass rods and thereby to produce capsules as described in Example 1.

The properties of the products obtained were similar to those of the corresponding amylose mixtures described in the preceding Examples, but transparency was generally superior, products containing up to 30 percent amylitol being fully transparent, and those containing 40 percent and 50 percent amylitol being only slightly opaque. Elasticity was relatively low with 30 percent amylitol but adequate for hard capsules, and further decreased as the amylitol content was increased. However, higher amylitol contents enhanced stability under varying temperature, reduced hygroscopicity, and made the capsules resistant to deformation. The addition of adequate amounts of amylitol thus completely compensated for the consequences of varying gelatin quality. When produced from mixtures containing 25 percent glycerol as a plasticizer, soft capsules of suitable strength were obtained from mixtures containing 20 percent to 50 percent amylitol.

The sheets of films stripped from the glass surfaces had properties so closely analogous to those of the capsules produced from the same mixtures as not to require separate description.

EXAMPLE 5

A 30 percent suspension of corn starch in water was held at 160° C until the starch was gelatinized. The resulting solution was quickly cooled to 50° C, mixed with isoamylase, and incubated for 2 days at pH 3.5. The hydrolysis mixture was filtered and partly evaporated, mixed with Raney nickel and hydrogenated under conventional conditions at 120° C and 130 atmospheres. The catalyst was removed from the hydrogenation mixture by filtration and the filtrate contained 80 percent amylitol of low molecular weight and only 20 percent amylitol having a molecular weight which corresponds to a degree of polymerization greater than 50 in the amylose. The amylitol solution was evaporated to a concentration of 30 percent and was mixed with a separately prepared 40 percent gelatin solution and glycerin to make the ratio of amylitol:gelatin:glycerol in the mixture 30:100:20 on a water-free basis.

When the solution was cast on clean metal plates in a coating of uniform thickness and dried in an air stream of 80° C, the films were not significantly different from those prepared from amylitol of low molecular weight only in their tensile strength and transparency. The solutions containing some amylitol of higher molecular weight were found particularly suitable for producing capsules rendered opaque by addition of titania or other pigments.

EXAMPLE 6

Equal parts of amylose and amylitol of low molecular weight were dissolved jointly in two parts of water while one part gelatin was dissolved separately in 1.5 parts hot water. Portions of the two solutions were combined to produce mixtures in which the gelatin amounted to 70 and 80 percent respectively of the total solids on a dry basis. 10 percent Glycerol calculated on the same basis were added to each mixture.

Layers 0.7 mm thick were cast from the two solutions on clean metal plates and dried in an air stream of 50° C. The sheets pulled from the plates were elastic, strong, nearly transparent, only slightly brittle and were suitable as wrapping material. Their properties made it obvious that other shaped objects could be prepared from the same solutions.

Glycerol may be replaced as a plasticizer in each of the preceding Examples by approximately equimolecular amounts of other polyhydric alcohols, such as sorbitol, maltitol, propyleneglycol, diglycerol, ethyleneglycol and pentaerythritol without significantly changing the properties of the shaped bodies ultimately obtained, and other substitutions will readily suggest themselves to those skilled in the art. The amounts of water specifically referred to in the Examples constitute the minimum amounts of water that will dissolve the solutes at the highest permissible or convenient temperatures, but they are not critical. If so desired, more water may be employed, particularly when lower temperatures make greater dilution advisable, and there is no upper limit to the amount of water from which cast films and other shaped bodies of the invention can be prepared. The amount of water present will have obvious consequences as to the thickness and other properties of the product, and may be chosen freely without critical upper limit to achieve desired results.

The ratio of gelatin, amylose and/or amylitol, and plasticizer, if any, will readily be chosen for specific applications on the basis of the above teachings. Less plasticizer will be employed under otherwise comparable conditions for producing hard capsules than for producing soft ones. If so desired, films, foils, or sheets may be prepared by extrusion rather than by casting, as will be obvious from Example 3, and other shaping methods familiar to those skilled in the art from their acquaintance with gelatin will be adapted without or with only minimal changes to the materials of this invention. Sponges can be produced by incorporating a gas or a foaming agent in the concentrated aqueous solutions of gelatin, amylitol and/or amylose, and plasticizer during the drying stage, and the plasticizer content will preferably exceed 20 percent to avoid brittleness of the sponge.

Soft, spherical capsules have been produced successfully by interposing the material to be encapsulated as a layer between two sheets of the invention prepared with relatively much plasticizer and not fully dried, and by sealing circular portions of the two films to each other under heat and a pressure sufficient to displace the intermediate layer from the area of the intended heat seal or weld. The product so obtained was punched into individual capsules.

Hydrophobic materials have been microencapsulated in coatings of the invention by dispersing or emulsifying the material to be encapsulated in aqueous solutions of gelatin, amylose and/or amylitol, and plasticizer, and spray drying the dispersion or emulsion. Other applications will readily suggest themselves to those skilled in the art.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

We claim:

1. A shaped, solid body consisting essentially of an intimate mixture of gelatin and at least one member of the group consisting of amylose and amylitol, the molecular weight of said member corresponding to a degree of polymerization of twenty to fifty glucose units in said amylose, and said member having a linear chain structure.

2. A body as set forth in claim 1, wherein the weight of said at least one member is between 10 and 60 parts per 100 parts of said gelatin.

3. A body as set forth in claim 1, further containing an amount of a polyhydric alcohol effective to increase the resiliency and the light transmission of said body.

4. A body as set forth in claim 3, wherein said polyhydric alcohol is glycerol, sorbitol, maltitol, or propyleneglycol.

5. A body as set forth in claim 3, wherein the amount of said polyhydric alcohol is 10% to 50% of the weight of said gelatin.

6. A body as set forth in claim 1 which is a film, a capsule, a sponge, a fiber, or a sheet.

7. A process for preparing the body set forth in claim 1 which comprises separately dissolving said gelatin and said at least one member in respective amounts of water, mixing the resulting solutions, and drying the mixture so obtained.

8. A process as set forth in claim 7, wherein said at least one member is amylose, and is prepared prior to said dissolving by enzymatic hydrolysis of starch.

9. A process as set forth in claim 7, wherein said at least one member is amylitol, and is produced prior to said dissolving by exposing starch to an enzyme having isoamylase activity until said amylose is prepared, and hydrogenating the prepared amylose.

* * * * *